(12) United States Patent
Bereza et al.

(10) Patent No.: US 8,654,898 B2
(45) Date of Patent: Feb. 18, 2014

(54) DIGITAL EQUALIZER FOR HIGH-SPEED SERIAL COMMUNICATIONS

(75) Inventors: William W. Bereza, Nepean (CA); Albert Vareljian, Folsom, CA (US); Rakesh H. Patel, Cupertino, CA (US)

(73) Assignee: Altera Corporation, San Jose, CA (US)

( * ) Notice: Subject to any disclaimer, the term of this patent is extended or adjusted under 35 U.S.C. 154(b) by 1262 days.

(21) Appl. No.: 12/117,515

(22) Filed: May 8, 2008

(65) Prior Publication Data

US 2009/0279597 A1    Nov. 12, 2009

(51) Int. Cl.
*H04L 27/01* (2006.01)
(52) U.S. Cl.
USPC ........................................ 375/323; 375/229
(58) Field of Classification Search
USPC .................................................. 375/232, 229
See application file for complete search history.

(56) References Cited

U.S. PATENT DOCUMENTS

| | | | |
|---|---|---|---|
| 5,390,216 A * | 2/1995 | Bilitza et al. | 375/354 |
| 6,075,814 A | 6/2000 | Yamano et al. | |
| 2001/0035994 A1 | 11/2001 | Agazzi et al. | |
| 2004/0008794 A1* | 1/2004 | McClellan | 375/260 |
| 2005/0152479 A1* | 7/2005 | Bulow et al. | 375/341 |
| 2005/0271137 A1* | 12/2005 | Kolze et al. | 375/233 |
| 2006/0274861 A1* | 12/2006 | Langenbach et al. | 375/341 |
| 2007/0041455 A1 | 2/2007 | Tran et al. | |
| 2008/0101510 A1 | 5/2008 | Agazzi | |
| 2009/0113504 A1* | 4/2009 | Jackson et al. | 725/114 |
| 2010/0226421 A1* | 9/2010 | Kibune | 375/229 |

FOREIGN PATENT DOCUMENTS

EP     1 006 697     6/2000

OTHER PUBLICATIONS

Bae, H.-M., et al., "An MLSE Receiver for Electronic Dispersion Compensation of OC-192 Fiber Links," *IEEE Journal of Solid-State Circuits*, vol. 41, No. 11, pp. 2541-2555 (Nov. 2006).

* cited by examiner

*Primary Examiner* — Michael Neff
(74) *Attorney, Agent, or Firm* — Ropes & Gray LLP; Jeffrey H. Ingerman

(57) ABSTRACT

Incoming data at a high-speed serial receiver is digitized and then digital signal processing (DSP) techniques may be used to perform digital equalization. Such digital techniques may be used to correct various data anomalies. In particular, in a multi-channel system, where crosstalk may be of concern, knowledge of the characteristics of the other channels, or even the data on those channels, may allow crosstalk to be subtracted out. Knowledge of data channel geometries, particularly in the context of backplane transmissions, may allow echoes and reflections caused by connectors to be subtracted out. As data rates increase, fractional rate processing can be employed. For example, the analog-to-digital conversion can be performed at half-rate and then two DSPs can be used in parallel to maintain throughput at the higher initial clock rate. At even higher rates, quadrature techniques can allow analog-to-digital conversion at quarter-rate, with four DSPs used in parallel.

25 Claims, 10 Drawing Sheets

DIGITAL EQUALIZER FOR HIGH-SPEED SERIAL COMMUNICATIONS

BACKGROUND OF THE INVENTION

This invention relates to a digital equalizer for high-speed serial communications, particularly in a high-speed serial interface of an integrated circuit device.

Many integrated circuit devices can be programmed. Examples of programmable integrated circuit devices include volatile and non-volatile memory devices, field programmable gate arrays ("FPGAs"), programmable logic devices ("PLDs") and complex programmable logic devices ("CPLDs"). Other examples of programmable integrated circuit devices include application-specific integrated circuits (ASICs), processors and microcontrollers that are programmable via internal or external memory. Programmable integrated circuit devices, such as programmable logic devices (PLDs) in particular, frequently incorporate high-speed serial interfaces to accommodate high-speed (i.e., greater than 1 Gbps) serial I/O standards. Higher data volumes demand high-speed, high-throughput data processing. Serial communication reduces the number of pins and parallel lines on a device and, therefore, reduces the overall cost of the device and reduces the problem of data skew in parallel lines by avoiding synchronous interfaces.

In such interfaces, many different signalling schemes may be used, including binary, Non-Return to Zero (NRZ), multi-level Pulse Amplitude Modulation (e.g., 4-PAM), and Duo-Binary. However, as data rates increase, particularly into the gigabit range, these may prove inadequate because of, e.g., inter-symbol interference (ISI)—due mostly to attenuation over long signal paths such as those that cross backplanes—as well as crosstalk. Attenuation is known to increase with frequency, and the changing data patterns as symbols change increase the effective frequency further, resulting in attenuation-induced ISI. Further, reflections at connectors and other terminations also may contribute to signal degradation.

Dispersion may be considered a major factor causing ISI. Data may have several frequency components, and attenuation in both backplanes and optical fiber is frequency-dependent. As a result, transmitted data having low-frequency content may arrive at the receiver at a slightly different time than data having higher-frequency content. Because in many high-speed serial systems, data are sent without a separate clock, the clock then must be extracted from the data using clock-data recovery (CDR) techniques. However, the foregoing time-of-flight differences introduce jitter (i.e., close the receive eye) which makes the process of recovering the data and clock harder. Therefore, CDR techniques may suffer as the foregoing effects degrade the received signal.

In optical fiber systems, optical dispersion is generally associated with chromatic and polarization dispersion phenomena, and correcting through equalization is often necessary and generally harder than correcting for backplane attenuation.

Various techniques have been developed in attempts to deal with these effects. Pre-Emphasis or De-Emphasis circuits may be used at the transmitter end, but the effect of pre-emphasis/de-emphasis may enhance crosstalk noise. "Equalization" techniques, including Feed-Forward Equalization (FFE) and analog Decision Feedback Equalization (DFE) may be used at the receiver end. These analog techniques are particularly adapted for dealing with ISI, but are limited in dealing with other effects, particularly optical nonlinear dispersion effects, and can be limited in scalability.

SUMMARY OF THE INVENTION

According to the present invention, incoming data at a high-speed serial receiver is digitized and then digital signal processing (DSP) techniques may be used to perform digital equalization. Because these techniques are digital, they may be used to correct more than conventional ISI. In particular, in a multi-channel system, where crosstalk may be of concern, knowledge of the characteristics of the other channels, or even the data on those channels, may allow crosstalk to be subtracted out.

As data rates increase, fractional rate processing can be employed. For example, the analog-to-digital conversion can be performed at half-rate (e.g., one channel sampling only on rising clock edges and another sampling only on falling clock edges) and then two DSPs can be used in parallel to maintain throughput at the higher initial clock rate. At even higher rates, quadrature techniques can allow analog-to-digital conversion at quarter-rate, with four DSPs used in parallel.

Therefore, in accordance with the present invention, there is provided a serial interface for an integrated circuit device. The serial interface includes a deserializer portion having digitizing circuitry, including an analog-to-digital converter, that digitizes received analog serial data. The serial interface also includes digital equalization circuitry that operates on the digitized received data to provide equalized digital data, and a demultiplexer for deserializing the digital serial data.

A system incorporating the serial interface, and a method, that can be used with interface, for deserializing data, also are provided.

BRIEF DESCRIPTION OF THE DRAWINGS

Further features of the invention, its nature and various advantages, will be apparent upon consideration of the following detailed description, taken in conjunction with the accompanying drawings, in which like reference characters refer to like parts throughout, and in which.

DETAILED DESCRIPTION

Figure 1:
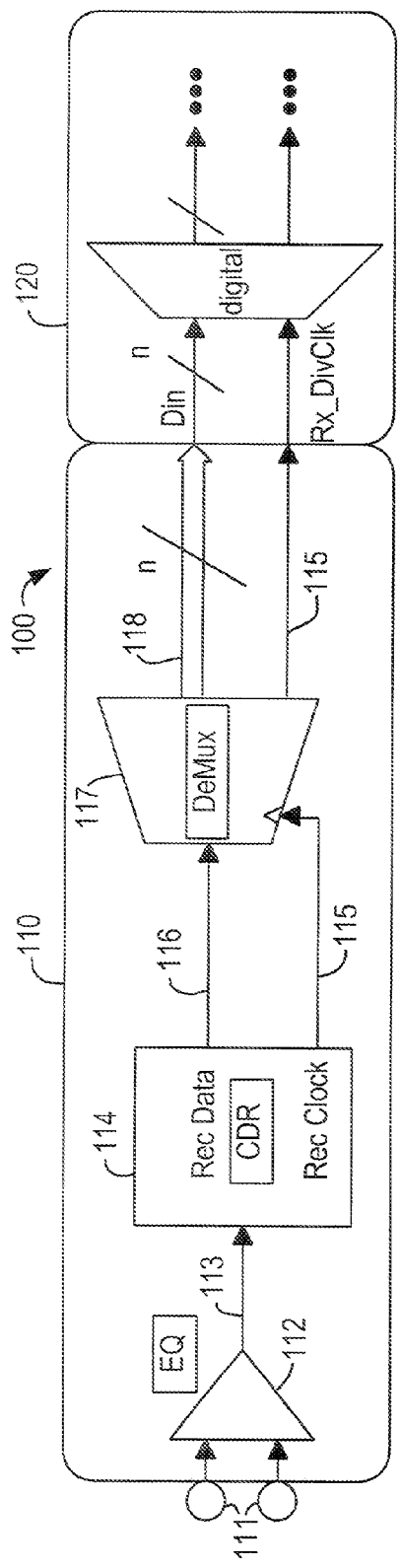
FIG. 1 is a schematic representation of a known serial receiver arrangement.

As a comparison, FIG. 1 shows a known serial receiver arrangement 100, including a deserializer portion 110 and a Physical Coding Sublayer (PCS) portion 120. Incoming data are received on terminals 111 (typically the data are differential, but in some cases the data may be single-ended in which case only one of terminals 111 may be used) and input to equalizer 112. Equalizer 112 operates according to one of the analog equalization techniques discussed above, such as FFE or analog DFE, or a combination of the two such as FFE followed by analog DFE. The resulting equalized serial data stream 113 is input to analog CDR circuitry 114, which extracts clock 115 and data 116. Data 116 are then deserialized by demultiplexer 117, which typically is a digital component, under control of clock 115, which is propagated through to PCS 120 along with the n-bit-wide parallel data stream 118. Any demultiplexer described herein may be assumed to have associated circuitry to divide down recovered clock 115. With the deserialized data accompanied by divided-down, recovered clock 115, the data transfer to the PCS becomes source-synchronous.

Thus, in known serial receivers, equalization is performed first, and in the analog domain. In contrast, in accordance with the present invention, the received serial data are first digitized, and subsequent processing occurs in the digital domain.

Figure 2:
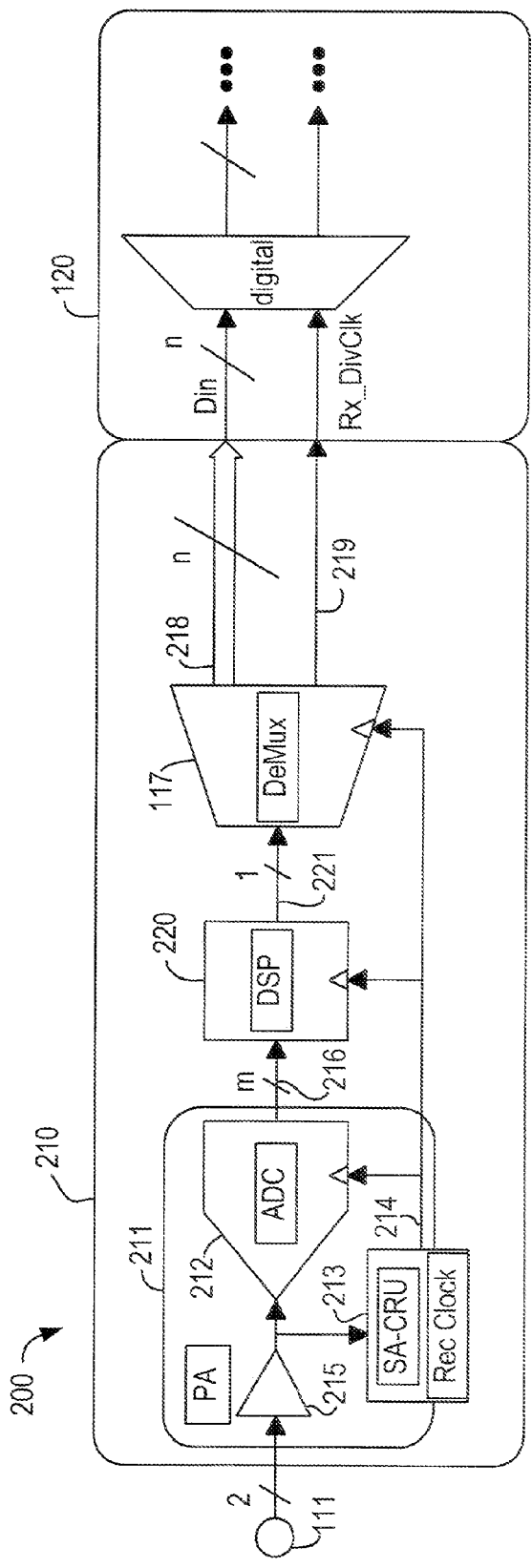
FIG. 2 is a schematic representation of a serial receiver arrangement according to a full-rate embodiment of the present invention in which equalization occurs before deserialization.

For example, serial receiver 200 of FIG. 2 includes a deserializer portion 210, and a PCS portion 120 like that in receiver 100. In deserializer portion 210, unlike in deserializer portion 110, the data received on terminal(s) 111 are digitized by digitizing circuitry 211 prior to any other processing.

Digitizing circuitry 211 preferably includes analog-to-digital (A/D) converter 212 and a clock recovery unit (CRU) 213. CRU 213 preferably is sense-amplifier-based, and thus preferably looks only for transitions in the data to derive the clock 214, unlike CDR circuitry 114 which must correctly determine the data as well. The data are sampled in A/D converter 212 by recovered clock 214, then passed on at full rate with m number of bits representative of the resolution desired, generally in binary format.

Digitizing circuitry 211 may also optionally include preamplifier (PA) 215. PA 215 could be used to provide adjustable linear gain and provide a mechanism to adjust the input threshold to minimize the bit error rate, particularly under highly nonlinear inter-symbol interference (ISI) conditions. If PA 215 is not used, the sense amplifier used in CRU 213 may provide sufficient limiting amplifier action on the incoming data to avoid or lessen metastability in CRU 213. This might be the case where the ISI is more linear and perhaps less heavy.

After being digitized in circuitry 211, the m-bit digitized serial data 216 are passed to digital DSP circuitry 220 where DSP techniques are used to equalize the data. The particular DSP techniques may vary according to the application, but can include equalization in the digital domain, which could be adaptive, to overcome ISI. They also may include decoding of bit-error-rate-lowering transmission techniques.

The DSP techniques also may include techniques that are particularly well-adapted to be performed in a digital domain, such as those that depend on a priori knowledge of certain properties of the data. Thus, in cases where termination mismatch or link discontinuities may cause echoes or reflections, knowledge of the geometry of the signal paths and the associated mismatches or discontinuities allows prediction of which bits may be affected, so that they can be compensated for (e.g., subtract out every nth bit). Similarly, serial receivers of this type frequently include a number of parallel channels, which can give rise to crosstalk. With knowledge of the characteristics of other channels, DSP techniques may be used to reduce or even cancel such crosstalk. Other digital filtering techniques, such as finite impulse response (FIR) or infinite impulse response (IIR) filtering also may be used. IIR filtering may be particularly well adapted to produce peaking effects that can be used as the digital equivalent of "peak forward" equalization (similar to pre-emphasis).

The output of DSP circuitry 220 preferably is a 1-bit wide serial digital data stream 221 that is then deserialized by digital demultiplexer 117. Both DSP circuitry 220 and demultiplexer 117 preferably are clocked by the same clock 214 from CRU 213 that is used by A/D converter 212. Clock 214 is then propagated through to PCS 120 as divided-down (1:n) clock 219 along with the n-bit-wide parallel data stream 218.

Many serial data channels operate at very high data rates, particularly considering that many operate at multiples of the system clock rate—e.g., with data sampled on both rising and falling edges of the clock (effectively twice the clock rate, or "half-rate" clocking), or in quadrature mode (effectively four times the clock rate, or "quarter-rate" clocking). At such high rates—e.g., over 6 Gbps or even over 10 Gbps—the requisite speed and resolution may be difficult to achieve in conventional CMOS processes in certain components, including the DSP and the A/D converter. In particular, it may be difficult to implement all but the simplest DSP functionality (e.g., using only high-speed shift-register-based logic) at data rates at or above 5-10 Gbps. As logic complexity increased, the maximum possible data rate would decrease. To compensate, half-rate and quarter-rate variants of the invention may be implemented.

Figure 3:
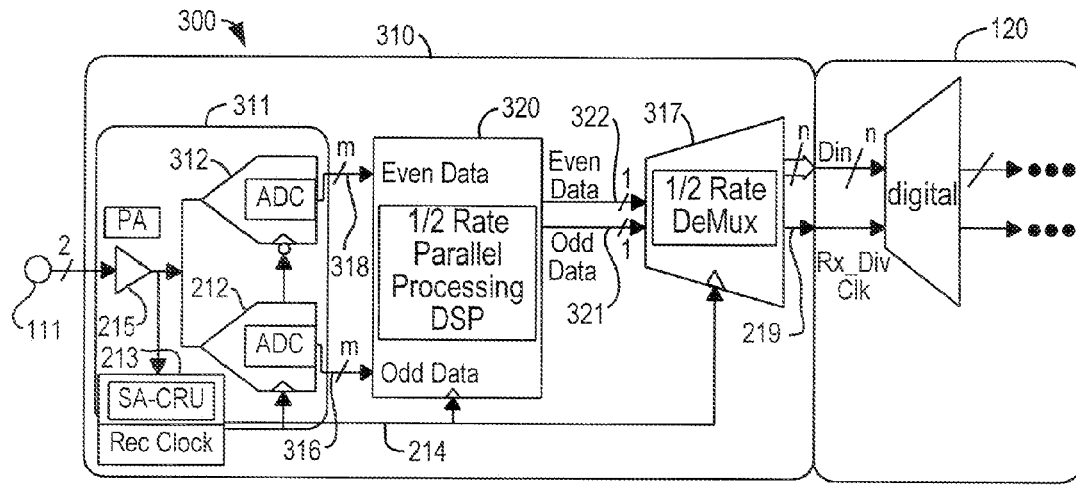
FIG. 3 is a schematic representation of a serial receiver arrangement according to a half-rate embodiment of the present invention in which equalization occurs before deserialization.

A half-rate embodiment 300 of a receiver in accordance with the invention is shown in FIG. 3. Receiver 300 as shown includes a deserializer portion 310, and a PCS portion 120 like that in receivers 100, 200. In deserializer portion 310, like in deserializer portion 210, the data received on terminal(s) 111 are digitized by digitizing circuitry 311 prior to any other processing.

Digitizing circuitry 311 includes two A/D converters 212, 312. A/D converter 212 is clocked on the rising edges of clock 214, while A/D converter 312 is clocked on the falling edges of clock 214, providing respective odd and even m-bit serial data streams 316, 318. These even and odd data are received by parallel-processing DSP circuitry 320 which operates at half-rate (i.e., half the data rate) and provides the same functionality as full-rate DSP 220 of FIG. 2, but more conducive to functional operation using CMOS technologies. Digitizing circuitry 311 alleviates the speed constraints on the A/D converters 212, 312, as well as DSP circuitry 320, as none of them needs to operate at the full data rate. The output of the half-rate DSP circuitry 320 is then sent serially as odd and even data streams 321, 322 to the demultiplexer 317, which operates at half-rate.

Each of the half-rate components—A/D converters 212, 312, DSP circuitry 320 and demultiplexer 317—receives a half-rate recovered clock 214 (in half-rate systems, the CRU produces a half-rate recovered clock), with both the rising and falling edges of clock 214 being used. In the case of A/D converters 212, 312, for example, each is an ordinary A/D converter clocked by a rising and falling edge of the half-rate clock, respectively (or vice-versa). Similar techniques can be used inside DSP circuitry 320 and demultiplexer 317. Half-rate clock 214 is received by demultiplexer 317 which then produces n bits of deserialized data along with a divided-down clock 219.

Figure 4:
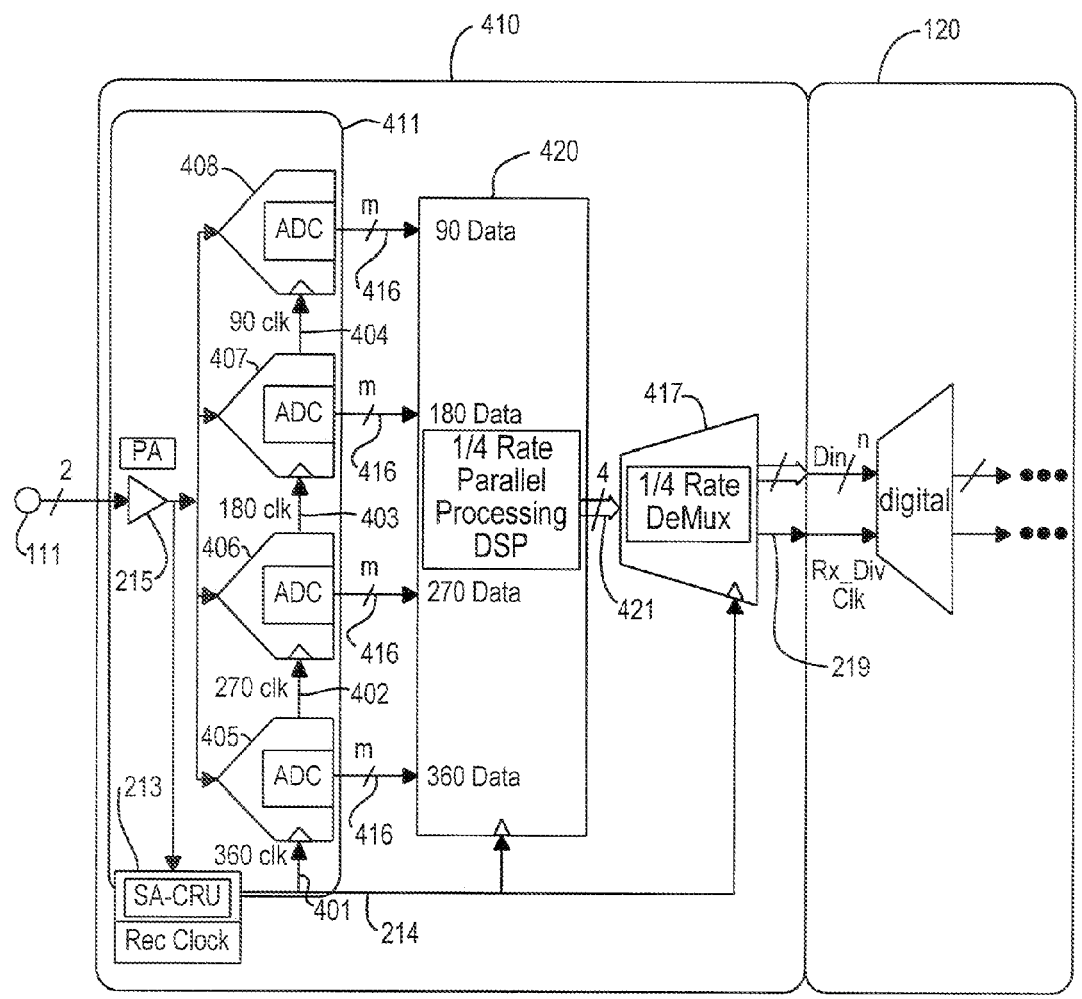
FIG. 4 is a schematic representation of a serial receiver arrangement according to a quarter-rate embodiment of the present invention in which equalization occurs before deserialization.

A further extension of the half-rate embodiment of FIG. 3 is a quarter-rate embodiment 400 as shown in FIG. 4, which further alleviates speed constraints. In digitizing circuitry 411 of deserializer 410, quadrature clocks 401, 402, 403, 404, each running at one-quarter of the full base data rate, but offset by 90° of phase, are implicitly part of clock bundle 214 output by CRU 213 (which may be implemented using quadrature voltage-controlled-oscillators), and sample quadrature data from A/D converters 405, 406, 407, 408, each of which is a basic A/D converter like A/D converter 212, capable of operating at one-quarter of the full base rate. Resulting quadrature m-bit data streams 416 are input to quarter-rate parallel-processing DSP circuitry 420. Quarter-rate demultiplexer 417 accepts four single-bit quadrature data streams 421 as clocked by the quadrature clocks 401-404 (also denoted as clock bundle 214). This gets demultiplexed into an n-bit word and is accompanied by demultiplexed clock 219 which is divided down by a ratio of 4:n to equal the parallel data rate to the PCS.

Figure 5:
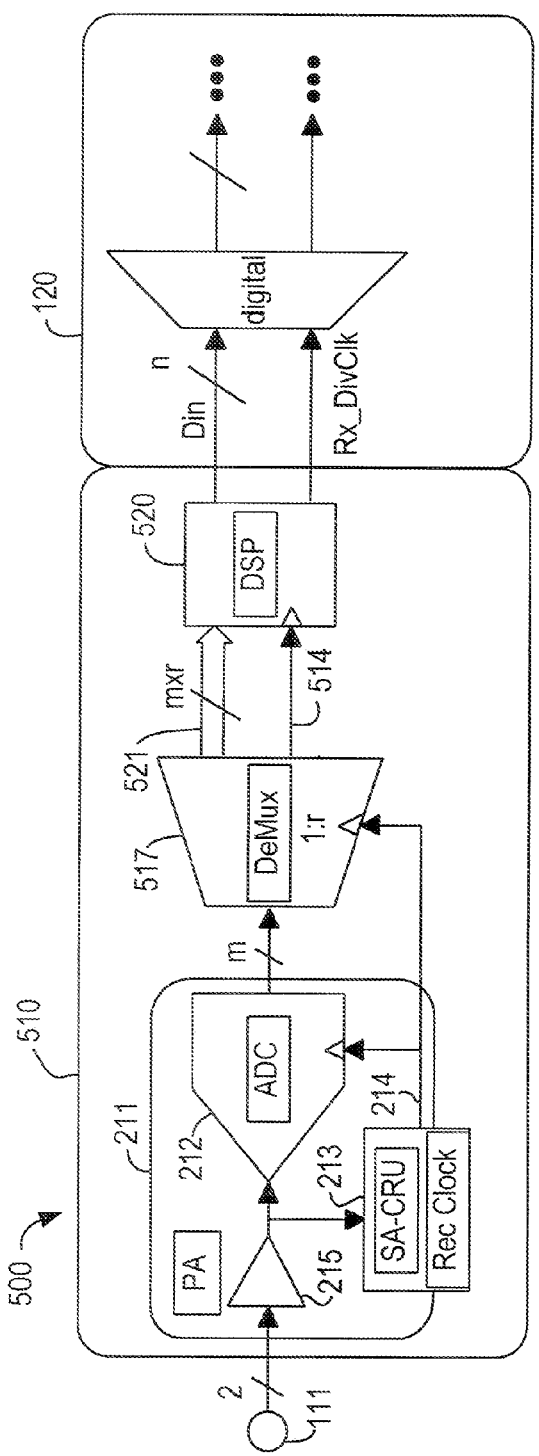
FIG. 5 is a schematic representation of a serial receiver arrangement according to a full-rate embodiment of the present invention in which equalization occurs after deserialization.
Figure 6:
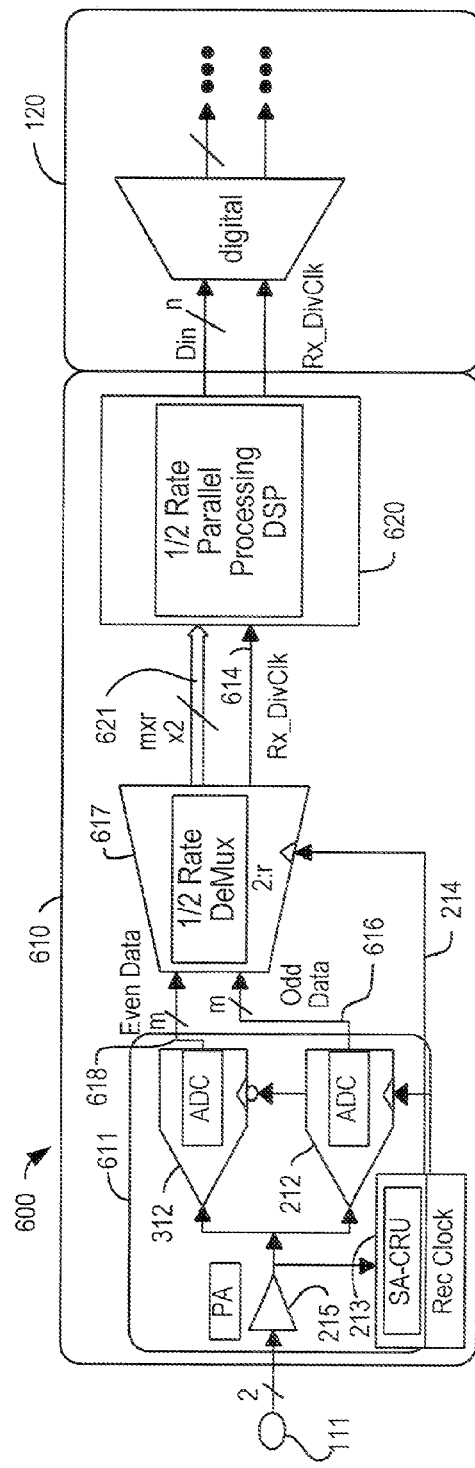
FIG. 6 is a schematic representation of a serial receiver arrangement according to a half-rate embodiment of the present invention in which equalization occurs after deserialization.
Figure 7:
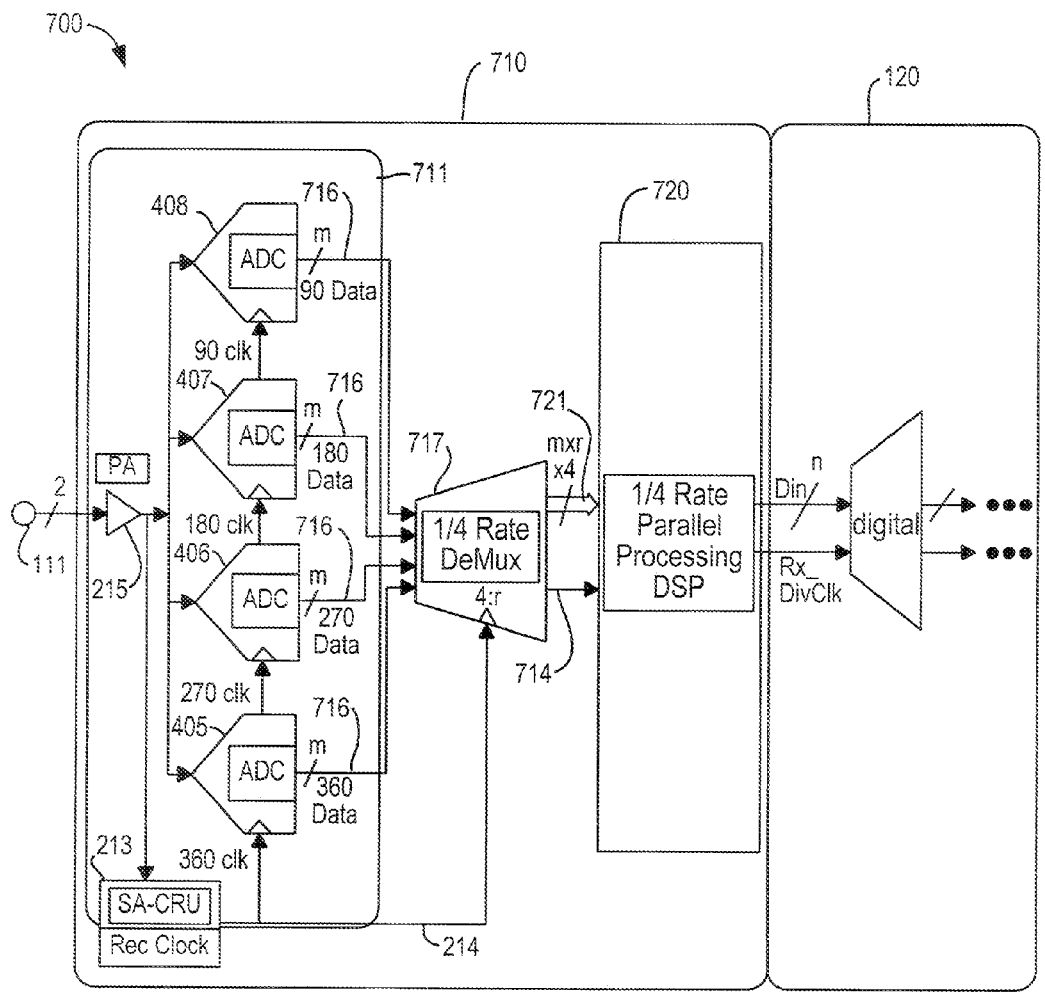
FIG. 7 is a schematic representation of a serial receiver arrangement according to a quarter-rate embodiment of the present invention in which equalization occurs after deserialization.

In all of the foregoing embodiments, the DSP circuitry came before the demultiplexer, so the DSP circuitry had to operate fast enough to deal with the serial data, even in the half- or quarter-rate embodiments of FIGS. 3 and 4, respectively. In the embodiments of FIGS. 5, 6 and 7, the DSP circuitry follows the deserializer in full-, half- and quarter-rate embodiments respectively. In such embodiments, although the DSP circuitry must be larger to deal with the parallel data, it need not deal with it as fast (i.e., at the full data rate). Specifically, the DSP circuitry can operate at 1/r times the respective full-, half- or quarter-rate, where r is the byte width—i.e., the number of bits per byte.

Figure 8:
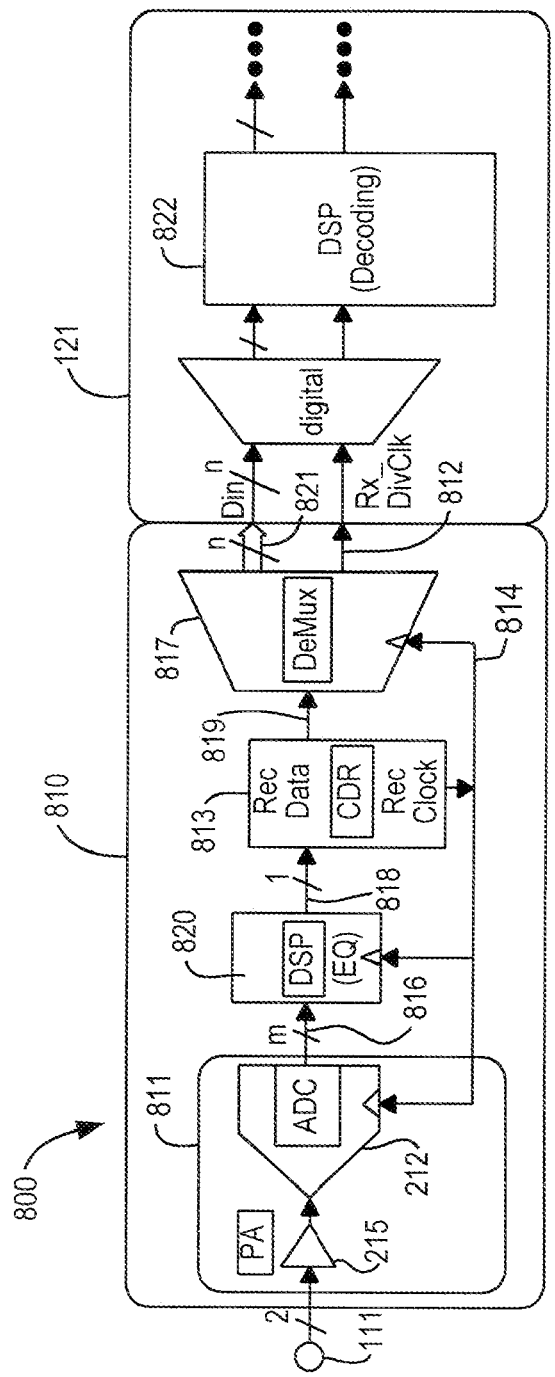
FIG. 8 is a schematic representation of a serial receiver arrangement according to a full-rate embodiment of the present invention including clock-data recovery, in which equalization occurs before deserialization.

Specifically, receiver 500 of FIG. 5 includes deserializer portion 510 and PCS portion 120. Deserializer portion 510 includes digitizing circuitry 511, which is similar to digitizing circuitry 211 of receiver 200. Demultiplexer 517 receives the m-bit data and the recovered clock 214 from digitizing circuitry 511 and deserializes it by the serialization factor r, outputting parallel data 521, as well as clock 514 which is clock 214 divided by r. DSP circuitry thus has to process m×r bits instead of m bits, but need operate at only 1/r of the data rate (or 1/r of the clock rate in this case). It also is possible to partition some of the DSP circuitry right before and right after demultiplexer 517 (somewhat similarly to the case shown in FIG. 8 below). In such a case, the number of bits into and out of the pre-demux portion of the DSP circuitry would be m bits wide and the number of bits into the post-demux portion of the DSP circuitry would be m×r bits wide.

Similarly, receiver 600 of FIG. 6 is like receiver 300 of FIG. 3, except that the DSP circuitry need operate at only 2/r of the half-rate clock. Specifically, receiver 600 includes deserializer portion 610 and PCS portion 120. Deserializer portion 610 includes digitizing circuitry 611, which is similar to digitizing circuitry 311 of receiver 300, outputting half-rate odd and even data 616, 618. Demultiplexer 617 receives the two m-bit half-rate data streams 616, 618 along with the recovered half-rate clock 214 from digitizing circuitry 611 and deserializes the half-rate data by half the serialization factor (i.e., by r/2), outputting parallel data 621, as well as clock 614 which is clock 214 divided by r/2. DSP circuitry 620 thus has to process 2×m×r bits instead of m bits, but need operate at only 2/r of the halved data rate (i.e., the deserialized data rate).

And again, receiver 700 of FIG. 7 is like receiver 400 of FIG. 4, except that DSP circuitry 720 need operate at only 4/r of the quarter-rate (quadrature) clock. Specifically, receiver 700 includes deserializer portion 710 and PCS portion 120. Deserializer portion 710 includes digitizing circuitry 711, which is similar to digitizing circuitry 411 of receiver 400, outputting quadrature data streams 716. Demultiplexer 717 receives the four m-bit quadrature-rate data streams 716 and the recovered quarter-rate clock 214 (a bundle of four quarter-rate quadrature clocks, separated from one another by 90° of phase) from digitizing circuitry 711 and deserializes the quarter-rate data by one-quarter of the serialization factor (i.e., by r/4), outputting parallel data 721, as well as clock 714 which is clock 214 divided by r/4. DSP circuitry thus has to process 4×m×r bits instead of m bits, but need operate at only 4/r of the quarter-rate (quadrature) clock.

As a further refinement of the present invention, instead of recovering the clock before equalization, the clock and data can be recovered by analog or digital CDR circuitry after digital equalization. A full-rate embodiment of a receiver 800 includes deserializer portion 810 and PCS portion 121. Deserializer portion 810 includes digitizing circuitry 811, which is similar to digitizing circuitry 211 of receiver 200, except that it lacks clock recovery unit (CRU) 213. The m-bit data 816 is equalized by DSP circuitry 820 and the serial output 818 is separated by clock-data recovery (CDR) circuitry 813, which could be analog or digital, into recovered clock 814 and recovered serial data 819.

Clock 814 used to clock ADC 212 of digitizing circuitry 811, DSP circuitry 820 and demultiplexer 817. Data 819 are deserialized by demultiplexer 817 by the serialization factor r, outputting parallel data 821, as well as passing on clock 814. Further DSP circuitry 822 in PCS 121 may be used to decode the deserialized data. Although clock 814 is not immediately valid, CDR circuitry 813 recovers the clock from data 818 within an acceptable number of clock cycles. CDR 813 outputs high-speed serial data 819 which then goes on to demultiplexer 817 for further deserialization from 1 to n bits, as well as the recovered clock 814 which is divided down by n in demultiplexer 817 to provide divided-down clock 812.

Figure 9:
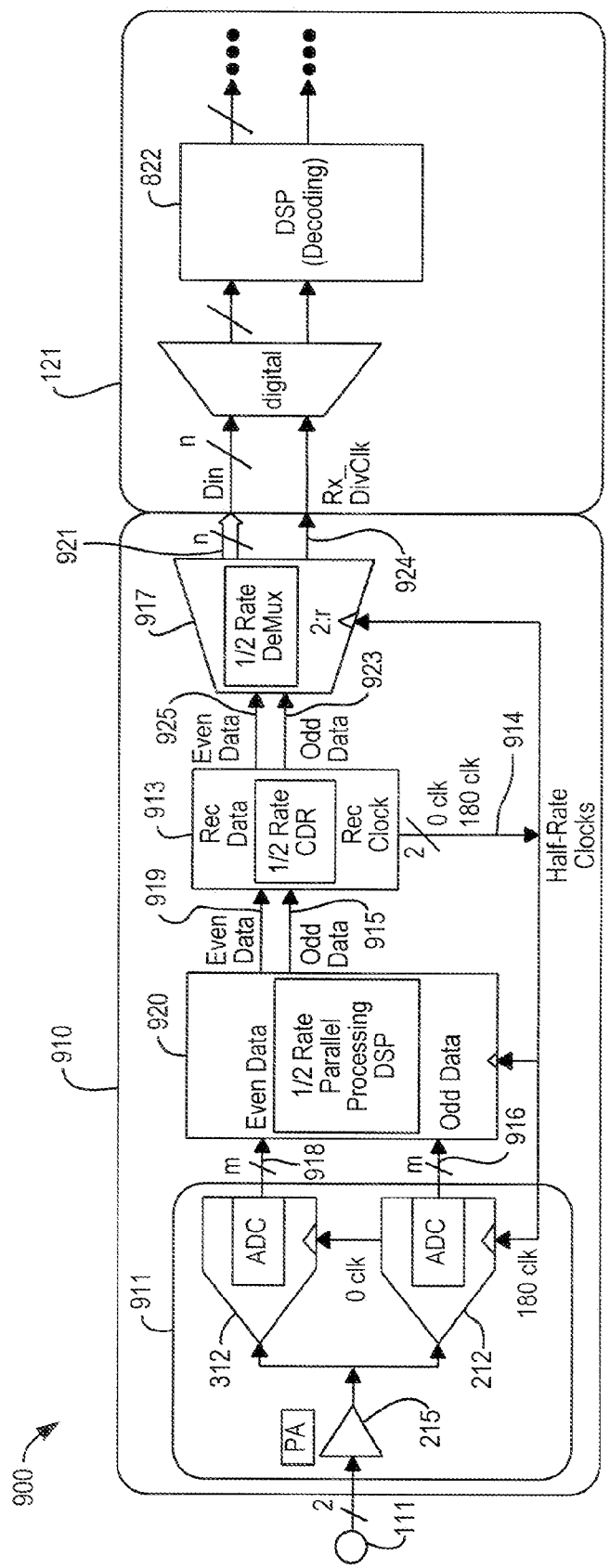
FIG. 9 is a schematic representation of a serial receiver arrangement according to a half-rate embodiment of the present invention including clock-data recovery, in which equalization occurs before deserialization.

FIG. 9 shows a half-rate embodiment of a receiver 900 using CDR after digital equalization. Deserializer portion 910 includes digitizing circuitry 911, which is similar to digitizing circuitry 311 of receiver 300 without CRU 213, outputting m-bit half-rate odd and even data 916, 918 which are equalized by DSP circuitry 920. Equalized odd and even serial output 915, 919 is separated by CDR circuitry 913, which could be analog or digital, producing recovered 0° and 180° half-rate clocks 914 and recovered odd and even serial data 923, 925. Clocks 914 are used to clock ADCs 212, 312 of digitizing circuitry 911, DSP circuitry 920 and demultiplexer 917. Data 923, 925 are deserialized by demultiplexer 917 by half the serialization factor r (i.e., by r/2 with respect to the recovered half-rate clock), and output as parallel data 921, along with clock 924 which is one of clocks 914 divided by r/2.

Figure 10:
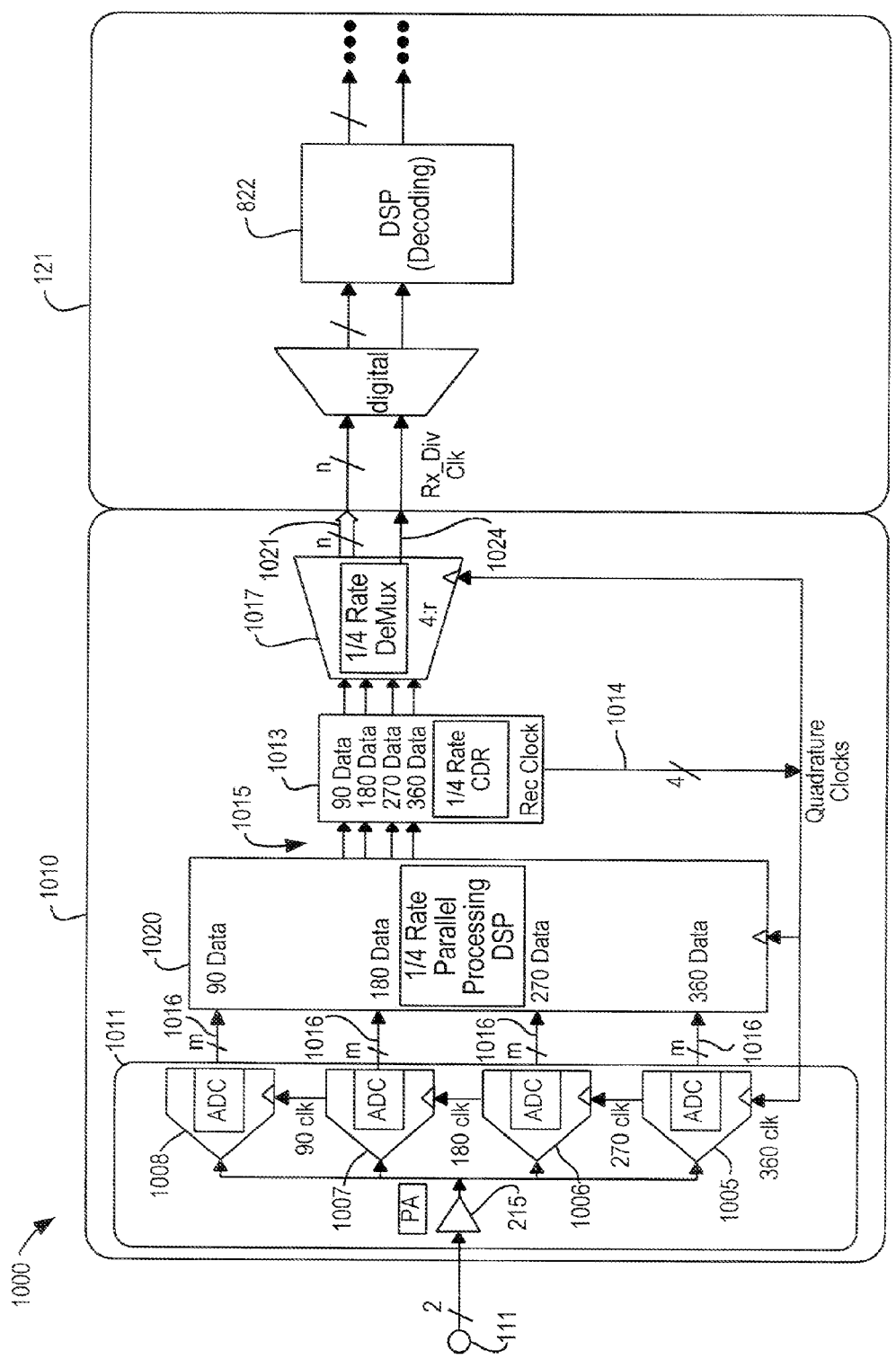
FIG. 10 is a schematic representation of a serial receiver arrangement according to a quarter-rate embodiment of the present invention including clock-data recovery, in which equalization occurs before deserialization.

In receiver 1000 of FIG. 10, DSP circuitry 1020 need operate at only 4/r of the quarter-rate quadrature clock. Specifically, receiver 1000 includes deserializer portion 1010 and PCS portion 121. Deserializer portion 1010 includes digitizing circuitry 1011, which is similar to digitizing circuitry 411 of receiver 400 without CRU 213, outputting quadrature data streams 1016 which are equalized by DSP circuitry 1020. Equalized quadrature serial output 1015 is separated by CDR circuitry 1013, which could be analog or digital, generating recovered quadrature clocks 1014 and recovered quadrature serial data 1021, all at quarter-rate. Quarter-rate quadrature clocks 1014 are used to clock ADCs 1005-1008 of digitizing circuitry 1011, DSP circuitry 1020 and demultiplexer 1017. Data 1021 are deserialized by demultiplexer 1017 by one quarter of the serialization factor (i.e., by r/4 with respect to the quarter-rate recovered clock), and output as parallel data 1021, along with clock 1024 which is one of clocks 1014 divided by r/4.

Figure 11:
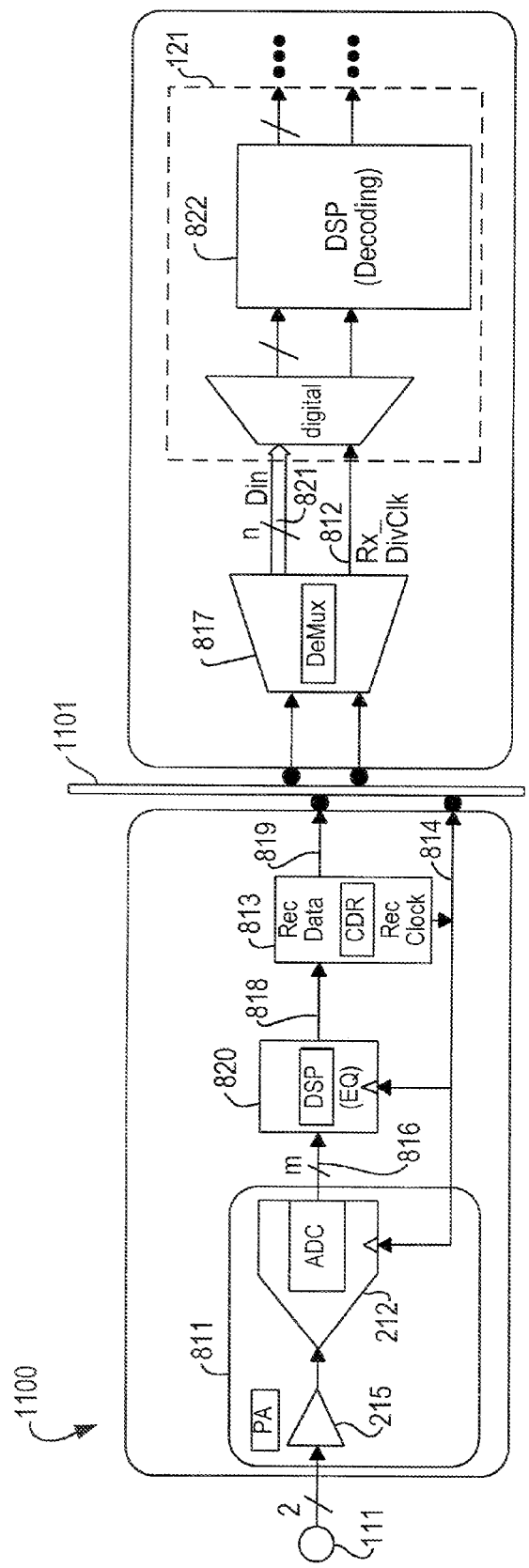
FIG. 11 is a schematic representation of a serial receiver arrangement according to a full-rate embodiment of the present invention including clock-data recovery, in which equalization occurs before deserialization, formed as a system-in-a-package.

Different portions of a receiver according to the present invention may have different power consumption and speed requirements. Accordingly, such a receiver can be implemented as a system-in-a-package, using different technologies for different portions. For example, receiver 1100 of FIG. 11 shows receiver 800 with digitizing circuitry 811, DSP circuitry 820 and CDR circuitry 813 implemented in SiGe, while demultiplexer 817 and PCS portion 121 are implemented in CMOS, with the SiGe and CMOS portions connected by interposer 1101.

Figure 12:
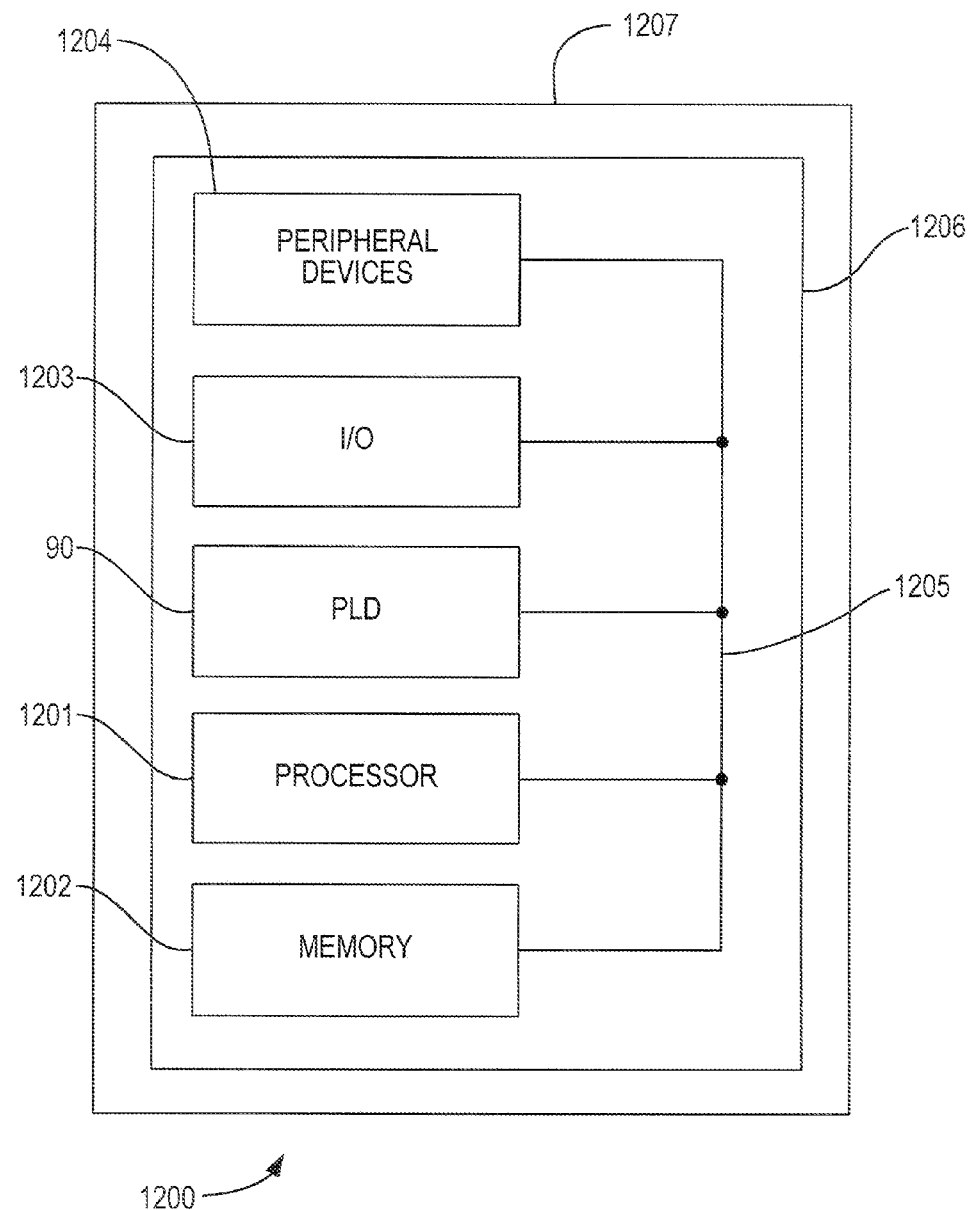
FIG. 12 is a simplified block diagram of an illustrative system employing a programmable logic device incorporating the present invention.

A programmable integrated circuit device such as a programmable logic device (PLD) 90, having a serial interface incorporating a receiver according to the present invention, may be used in many kinds of electronic devices. One possible use is in a data processing system 1200 shown in FIG. 12. Data processing system 1200 may include one or more of the following components: a processor 1201; memory 1202; I/O circuitry 1203; and peripheral devices 1204. These components are coupled together by a system bus 1205 and are populated on a circuit board 1206 which is contained in an end-user system 1207.

System 1200 can be used in a wide variety of applications, such as computer networking, data networking, instrumentation, video processing, digital signal processing, or any other application where the advantage of using programmable or reprogrammable logic is desirable. PLD 90 can be used to perform a variety of different logic functions. For example, PLD 90 can be configured as a processor or controller that works in cooperation with processor 1201. PLD 90 may also be used as an arbiter for arbitrating access to a shared resources in system 1200. In yet another example, PLD 90 can be configured as an interface between processor 1201 and one of the other components in system 900. It should be noted that system 1200 is only exemplary, and that the true scope and spirit of the invention should be indicated by the following claims.

Various technologies can be used to implement PLDs 90 as described above and incorporating this invention. And although the invention has been described in the context of PLDs, it may be used with any programmable integrated circuit device.

Receivers such as those described above can be used in systems in which a plurality of circuit boards are connected to a common backplane and data is transmitted between circuit boards across that backplane, or across optical interfaces that include optical fiber.

Figure 13:
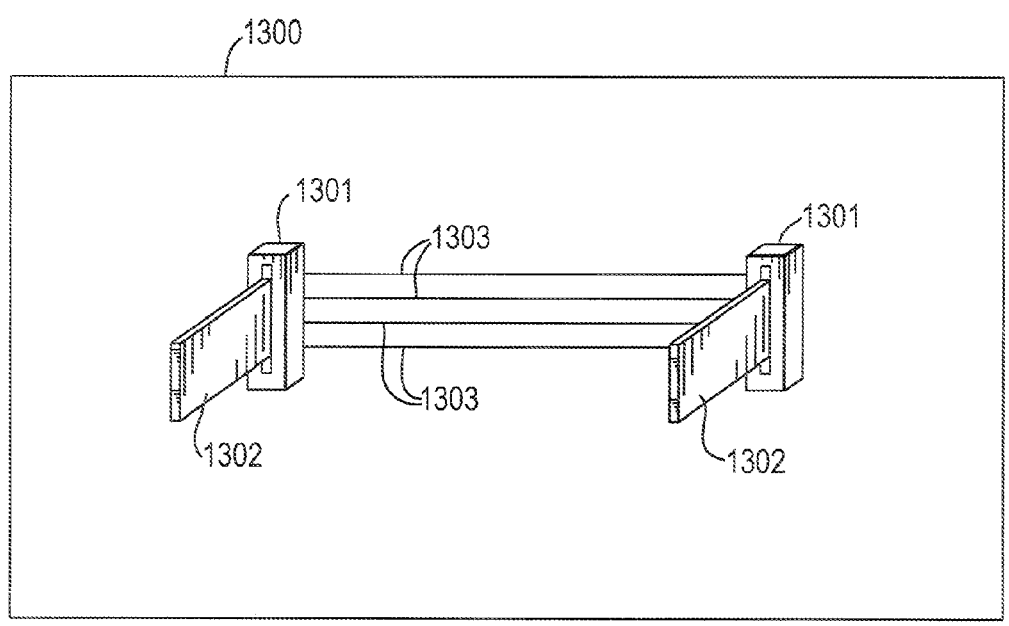
FIG. 13 shows an exemplary system with which the present invention could be used.

A plurality of channels may be involved. Each circuit board may include one or more serial data channels, and there may be a plurality of boards. Thus, even if each board has only one channel, there still may be a plurality of channels across the backplane or optical interface. FIG. 13 shows an example in which backplane 1300 includes two connectors 1301 each having a line card 1302 mounted therein. A plurality of traces 1303 cross the backplane carrying multiple data channels between the two line cards 1302. In this example, because the geometry and other characteristics of the multiple data channels are known, the DSP equalization circuitry will be able to more easily compensate for crosstalk among the channels. Similarly, because the locations of all connectors and other features that may cause echoes or reflections are known, the DSP equalization circuitry will be able to more easily to compensate for those phenomena as well—e.g., by intentionally dropping certain bits or packets of bits which, based on their timing, are likely to have been the result of echo or reflection.

Although the example of FIG. 13 includes only two line cards 1302 with multiple channels between them, in other examples (not shown) there may be more line cards 1302, with any one pair of line cards 1302 having one or more channels between them, so that there will be multiple channels even if there is only one channel between the line cards in a respective pair of line cards.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. A serial interface for an integrated circuit device, said serial interface comprising:
a deserializer portion comprising:
digitizing circuitry that digitizes received analog serial data, said digitizing circuitry comprising a plurality of analog-to-digital converters that provide a corresponding plurality of reduced-rate data streams of digitized received serial data;
digital equalization circuitry that operates on said digitized received serial data to provide equalized digital data;
a demultiplexer downstream of said digital equalization circuitry for deserializing said equalized digital data; and
a clock recovery unit that provides a clock for said analog-to-digital converters, said digital equalization circuitry and said demultiplexer; wherein:
said digital equalization circuitry and said demultiplexer operate at correspondingly reduced rates.

2. The serial interface of claim 1 wherein said clock recovery unit is in said digitizing circuitry.

3. The serial interface of claim 2 wherein said clock recovery unit is an analog clock recovery unit upstream of said analog-to-digital converters.

4. The serial interface of claim 2 wherein said clock recovery unit is a digital clock-data recovery unit downstream of said analog-to-digital converters.

5. The serial interface of claim 1 wherein said clock recovery unit comprises clock-data recovery circuitry downstream of said digitizing circuitry.

6. The serial interface of claim 1 wherein said digital equalization circuitry comprises digital signal processing circuitry.

7. A serial interface for an integrated circuit device, said serial interface comprising:
a deserializer portion comprising:
digitizing circuitry, including a plurality of analog-to-digital converters, that digitizes analog serial data received at an initial rate to provide a corresponding plurality of reduced-rate data streams of digitized received serial data;
digital equalization circuitry that operates on said digitized received serial data to provide equalized digital data;
a demultiplexer for deserializing said digital serial data; and
a clock recovery unit that provides a plurality of clock signals corresponding to said plurality of reduced-rate data streams.

8. The serial interface of claim 7 wherein:
said plurality of analog-to-digital converters comprises two analog-to-digital converters;
said reduced-rate data streams are half-rate data streams; and
said clock recovery unit provides odd and even clocks 180° out-of-phase from each other, operating at one of (a) half the full-rate clock, or (b) half the full data rate.

9. The serial interface of claim 7 wherein:
said plurality of analog-to-digital converters comprises four analog-to-digital converters;
said reduced-rate data streams are quarter-rate data streams; and
said clock recovery unit provides quadrature clocks at one of (a) one-quarter of the full-rate clock, or (b) one-quarter of the full data rate.

10. The serial interface of claim 7 wherein said clock recovery unit is an analog clock recovery unit upstream of said analog-to-digital converters.

11. The serial interface of claim 7 wherein said clock recovery unit is a digital clock-data recovery unit downstream of said analog-to-digital converters.

12. A serial interface for an integrated circuit device, said serial interface comprising:
a deserializer portion comprising:
digitizing circuitry that digitizes received analog serial data, said digitizing circuitry comprising a plurality of analog-to-digital converters that provide a corresponding plurality of reduced-rate data streams of digitized received serial data;
a demultiplexer for deserializing said digitized received serial data to provide deserialized digitized received data; and
digital equalization circuitry, downstream of said demultiplexer, that operates on said deserialized digitized received data to provide equalized digital data; wherein:
said demultiplexer operates at a reduced rate corresponding to said reduced-rate data streams; and
said digital equalization circuitry operates at a rate further reduced by a demultiplexing factor of said demultiplexer.

13. A serial data system for communicating between or among (a) optical components or fiber, or (b) components mounted on a backplane, said serial data system comprising:
a plurality of connectors on said backplane;
a plurality of data conductors on said backplane interconnecting said plurality of connectors; and
respective components mounted in connectors in said plurality of connectors; each said respective component including a serial interface comprising:
a deserializer portion and a physical coding sublayer portion, said deserializer portion propagating deserialized data to said physical coding sublayer portion, and comprising:
digitizing circuitry, including a plurality of analog-to-digital converters, that digitizes analog serial data received at an initial rate to provide a corresponding plurality of reduced-rate data streams of digitized received serial data,
digital equalization circuitry that operates on said digitized received serial data to provide equalized digital data,
a demultiplexer for deserializing said equalized digital data, and
a clock recovery unit that provides a plurality of clock signals corresponding to said plurality of reduced-rate data streams; wherein:
operation of said digital equalization circuitry on said digitized received data includes compensation for at least one of (a) crosstalk among said data conductors, (b) reflections at said connectors, and (c) echoes from said connectors.

14. The serial data system of claim 13 wherein said digital equalization circuitry comprises digital signal processing circuitry.

15. A serial data system for communicating between or among (a) optical components or fiber, or (b) components mounted on a backplane, said serial data system comprising:
a plurality of connectors on said backplane;
a plurality of data conductors on said backplane interconnecting said plurality of connectors; and
respective components mounted in connectors in said plurality of connectors; each said respective component including a serial interface comprising:
a deserializer portion and a physical coding sublayer portion, said deserializer portion propagating deserialized data to said physical coding sublayer portion, and comprising:
digitizing circuitry, including an analog-to-digital converter, that digitizes received analog serial data,
digital equalization circuitry that operates on said digitized received data to provide equalized digital data,
a demultiplexer for deserializing said digital serial data, and
a clock recovery unit that provides a plurality of clock signals corresponding to said plurality of reduced-rate data streams; wherein:
operation of said digital equalization circuitry on said digitized received data includes compensation for at least one of (a) crosstalk among said data conductors, (b) reflections at said connectors, and (c) echoes from said connectors.

16. The serial data system of claim 15 wherein:
said plurality of analog-to-digital converters comprises two analog-to-digital converters;
said reduced-rate data streams are half-rate data streams; and
said clock recovery unit provides odd and even clocks 180° out-of-phase from each other, operating at one of (a) half the full-rate clock, or (b) half the full data rate.

17. The serial data system of claim 15 wherein:
said plurality of analog-to-digital converters comprises four analog-to-digital converters;
said reduced-rate data streams are quarter-rate data streams; and said clock recovery unit provides quadrature clocks, operating at one of (a) one-quarter of the full-rate clock, or (b) one-quarter of the full data rate.

18. The serial data system of claim 15 wherein said clock recovery unit is an analog clock recovery unit upstream of said analog-to-digital converters.

19. The serial data system of claim 15 wherein said clock recovery unit is a digital clock-date recovery unit downstream of said analog-to-digital converters.

20. The serial data system of claim 15 wherein:
said digital equalization circuitry is upstream of said demultiplexer; and
said digital equalization circuitry and said demultiplexer operate at correspondingly reduced rates.

21. The serial data system of claim 15 wherein:
said digital equalization circuitry is downstream of said demultiplexer;
said demultiplexer operates at a correspondingly reduced rate; and
said digital equalization circuitry operates at a rate further reduced by a demultiplexing factor of said demultiplexer.

22. A method for deserializing analog serial data in an integrated circuit device, said method comprising:
digitizing received analog serial data to provide a plurality of reduced-rate data streams of digitized received serial data;
recovering from said received data a plurality of clock signals corresponding to said plurality of reduced-rate data streams;
digitally equalizing said digitized received serial data to provide equalized digital data; and
demultiplexing said equalized digital data.

23. The method of claim 22 wherein said recovering occurs after said digitizing.

24. The method of claim 22 wherein:
said digitizing comprises providing two half-rate data streams.

25. The method of claim 22 wherein:
said digitizing comprises providing four quarter-rate data streams.

* * * * *